(12) United States Patent
Eslambolchi et al.

(10) Patent No.: US 6,217,233 B1
(45) Date of Patent: Apr. 17, 2001

(54) RESTORATION SPLICE METHOD AND APPARATUS

(75) Inventors: Hossein Eslambolchi, Basking Ridge, NJ (US); John Sinclair Huffman, McDonough; Ronald L. Sims, Conyers, both of GA (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/209,802

(22) Filed: Dec. 11, 1998

(51) Int. Cl.[7] .................................................... G02B 6/38
(52) U.S. Cl. ............................... 385/95; 385/31; 385/88; 385/89; 385/90; 385/91; 385/92; 385/93; 385/94; 385/95; 385/96; 385/97; 385/98; 385/99; 385/114; 385/136; 385/137; 156/158
(58) Field of Search .................... 385/88–99, 31, 385/114, 137, 136; 156/158

(56) References Cited

U.S. PATENT DOCUMENTS

| 4,717,233 | * | 1/1988 | Skaradnik | 350/96.21 |
| 4,919,510 | * | 4/1990 | Hoke et al. | 350/96.21 |
| 5,189,717 | * | 2/1993 | Larson et al. | 385/95 |
| 5,351,331 | * | 9/1994 | Chun et al. | 385/97 |
| 5,896,481 | * | 4/1999 | Beranek et al. | 385/90 |

* cited by examiner

Primary Examiner—Frank G. Font
Assistant Examiner—Michael P. Mooney

(57) ABSTRACT

A quick restoration splice block comprises a rectangular block of transparent material including an opening for accepting the prepared endfaces of the pair of fibers to be spliced. A brightly colored indicator stripe is formed on the underside of the fiber opening. As the fiber endfaces are moved toward each other, the indicator stripe will be covered. When the stripe is no longer visible, butt-to-butt coupled of the fibers is achieved.

13 Claims, 1 Drawing Sheet

RESTORATION SPLICE METHOD AND APPARATUS

BACKGROUND OF THE INVENTION

The present invention relates to a restoration method and apparatus for quickly and effectively performing "field" splices on optical fiber.

Quick restoration of optical signal paths is essential when failures occur in an optical fiber network. The failures ranges from cable breaks due to contractor "dig ups" to environmental damage (such as lightning strikes and cable burn). To repair these types of failures, a communication field technician must find and isolate the damaged section of fiber cable, dig up the cable, and splice the fibers back together. Restoration splicing consists of using a quick, temporary splice that will optically couple the cut fiber back together. The most critical characteristic of an optical fiber splice is its insertion loss, that is, the signal loss due to misalignment of the fibers. The misalignment may be along the optical axes between the fibers, or the misalignment may result from too large of a transverse separation between the ends of the fibers. There exist in the art may different type of connector blocks including V-groove channels for locating the fibers prior to splicing. The V-groove channels address the axial misalignment alignment problem, but cannot improve insertion loss related to improper spacing between fiber endfaces. Index matching mediums (gels) may be used to improve the coupling between fiber ends. Oftentimes, however, the gel has bubbles, contaminants or other discontinuities that tend to migrate during the splice operation, and thereafter with temperature cycling. Such migration of the gel and microbubbles can detrimentally affect the splice quality. It would, therefore, be desirable and advantageous to provide a splice element that would eliminate the need to use index matching gel between the fiber endfaces.

SUMMARY OF THE INVENTION

The need remaining in the prior art is addressed by the present invention, which relates to a restoration method and apparatus for quickly and effectively performing "field" splices on optical fiber.

In accordance with the present invention, a transparent splice block is utilized, the block including carefully milled openings for insertion (through either end) of the bare optical fibers. In order to allow for the required "butt-to-butt" coupling of the fiber endfaces, a brightly-colored stripe is disposed on the underside of the splice opening. In operation, the bare fibers inserted through either end of the opening and pushed inward toward each other until the bright color is no longer visible—indicating that the endfaces of the fibers have come into contact.

In a preferred embodiment, the transparent splice block comprises a glass material with the fiber opening milled through the center thereof. For conventional optical fibers, the opening is milled to accept 250 micron fibers, with a bare fiber diameter of 125 microns. In an exemplary arrangement, a bright red stripe may be disposed on the underside of the splice opening to be used as an indicator that the fiber endfaces have come into contact.

Various other arrangements of the present invention will become apparent during the course of the following discussion and by reference to the accompanying drawings.

BRIEF DESCRIPTION OF THE DRAWINGS

Referring now to the drawings, where like numerals represent like parts in both views.

DETAILED DESCRIPTION

Figure 1:
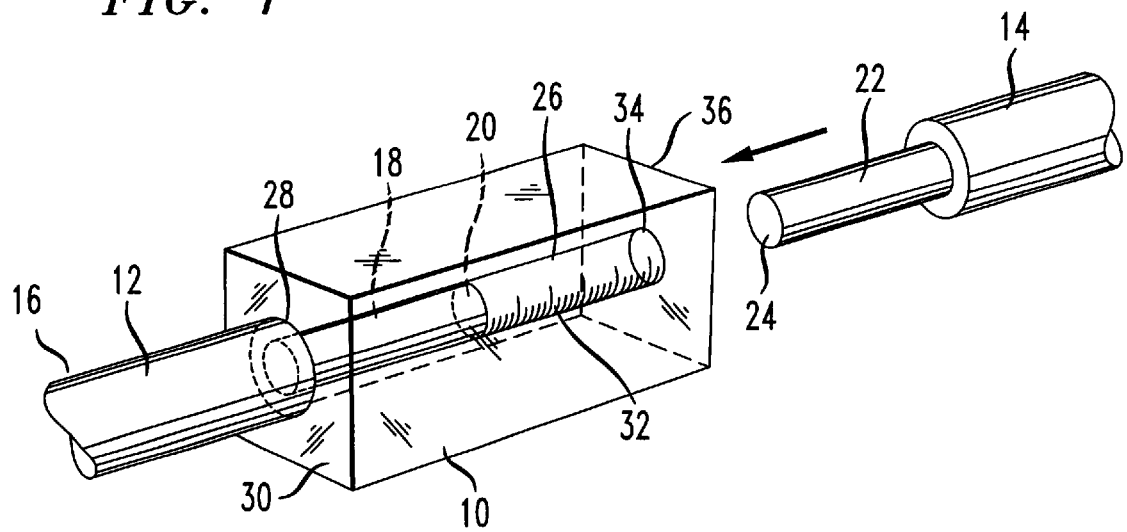
FIG. 1 illustrates an exemplary quick restoration splice block formed in accordance with the present invention.

An exemplary quick restoration splice block 10 formed in accordance with the present invention is illustrated in FIG. 1. In general, restoration splice block 10 is used to provide a relatively quick (and usually temporary) reconnection between a first optical fiber 12 and a second optical fiber 14. Prior to mating fibers 12 and 14 within splice block 10, the ends of the fibers need to be prepared. That is, any damaged material on the ends of the fibers needs to be removed (i.e., any damage due to fire, cable cut, or other environmental factors). Once the damaged sections are removed, the end portions of fibers 12 and 14 need to be re-finished. In particular, an end section of outer cladding 16 surrounding fiber 12 is removed to expose bare fiber 18. Fiber 12 is also cleaved to form a "clean" endface 20, where endface 20 is formed to be essentially perpendicular to the transverse optical axis of fiber 12. Fiber 14 is similarly prepared to expose a portion of bare fiber 22 with a cleaved endface 24.

As mentioned above, quick restoration splice block 10 is formed of a transparent material and includes a fiber opening 26 formed through the interior thereof For example, restoration splice block may comprise glass, silicon, or any appropriate transparent engineering plastic material. In the exemplary embodiment of FIG. 1, restoration splice block 10 is rectangular in form and fiber opening 26 is disposed through the length of block 10, along the indicated x-axis direction. It is to be understood that various other geometries for restoration splice block 10 are possible and all are considered to fall within the spirit and scope of the present invention. Referring back to FIG. 1, fiber 12 is inserted into fiber opening 26 via a first aperture 28 of opening 26, where first aperture 28 is shown as terminating at a first sidewall 30 of restoration splice block 10. For use with conventional fibers, opening 26 may be bored to include an outer diameter of 250 microns to accommodate cladded fiber and tapered to a diameter of 125 microns to accept bare fiber. A connection indicator stripe 32 is shown as disposed along the bottom surface of fiber opening 26. Fiber 14 is inserted into opening 26 via a second aperture 34 formed in a second, opposing end wall 36 of restoration splice block 10. Fiber 14 is fed into opening 26 until endface 24 of fiber 14 comes into contact with endface 20 of fiber 12. In accordance with the present invention, fiber 14 is inserted into opening 26 and pushed along, covering connection indicator stripe 32 as it is inserted. Since block 10 is formed of transparent material, the repair personnel performing the splice can visually inspect the insert progress of fiber 14 into splice block 10. At the point in time when indicator stripe 32 is no longer visible, the repair personnel can presume that fibers 12 and 14 are properly butt coupled within splice block 10 and the repair is complete.

Figure 2:
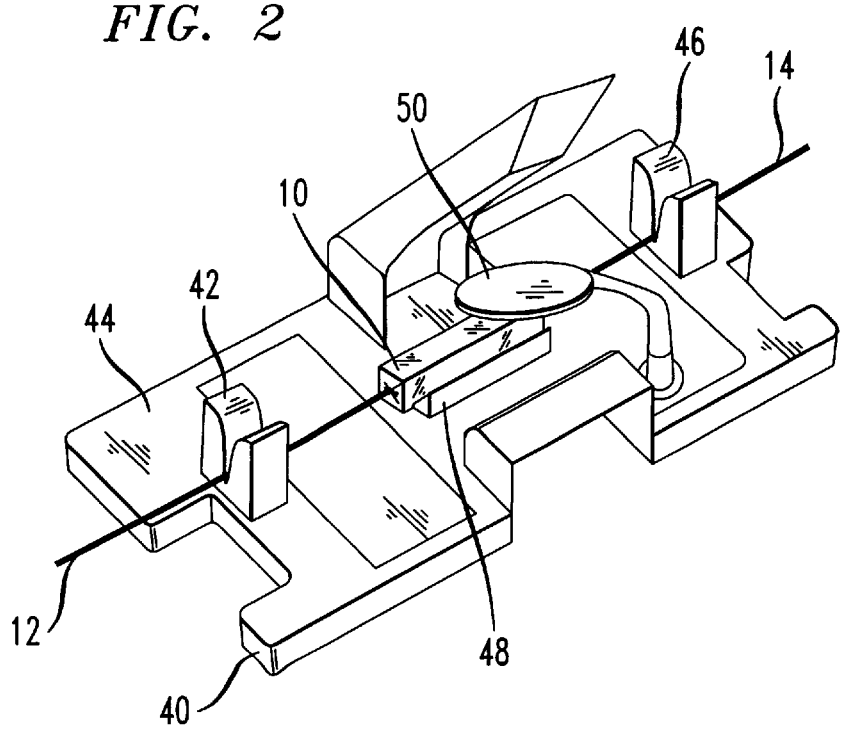
FIG. 2 contains a diagram of an exemplary splice work station utilizing the quick restoration splice block present invention.

An exemplary splice work station 40 including quick restoration splice block 10 of the present invention is illustrated in FIG. 2. Fiber 12 is shown as supported through a first V-groove member 42 attached to base 44 of work station 40. Fiber 14 is similarly supported in a second V-groove member 46 attached to the opposing end of base 44. Quick restoration splice block 10 is disposed on base 44 intermediate of V-groove members 44,46, where a splice wedge 48 is attached to base 44 and is used to hold restoration splice block stationary during the splicing process. A magnifying glass 50 may be included with work station 40 to aid the repair personnel in viewing the insertion of fibers 12 and 14 into restoration splice block 10. Various other work stations arrangement are possible and work station 40 should be considered as exemplary.

It is to be understood there are various modifications to the above-described arrangement and all are considered to fall within the spirit and scope of the present invention. For example, the connection indicator stripe may be formed on the bottom surface of the restoration block itself, instead of along the bottom surface of the fiber opening. Additionally, an exemplary quick restoration fiber splice may be formed to splice multiple fibers within the same structure, that is, with a plurality of fiber openings disposed contiguously through the length of the splice block. Further, the splice block may be formed of any suitable transparent material, including but not limited to glass, silicon, or a transparent engineering plastic.

What is claimed is:

1. A restoration splice block for splicing a pair of optical fibers, said splice block comprising a transparent member including a fiber opening disposed through a central region thereof, the member defined as including a first end wall and a second end wall and the fiber opening defined as including a first aperture at said first end wall and a second aperture as said second end wall; and a connection indicator stripe disposed along an underside of said fiber opening such that as the pair of optical fibers are inserted through the first and second apertures of said fiber opening said pair of optical fibers will cover said connection indicator stripe.

2. A restoration splice block as defined in claim 1 wherein said transparent member comprises a rectangular member and the fiber opening is disposed along the length of said rectangular member.

3. A restoration splice block as defined in claim 1 wherein the transparent member comprises a glass material.

4. A restoration splice block as defined in claim 1 wherein the connection indicator stripe is formed along a bottom surface portion of the fiber opening.

5. A restoration splice block as defined in claim 1 wherein the connection indicator stripe is formed along a bottom surface portion of the transparent member.

6. A restoration splice block for splicing a first array of optical fibers to a second array of optical fibers, said splice block comprising a transparent member including a plurality of fiber openings disposed through a central region thereof, the member defined as including a first end wall and a second end wall and each opening in the plurality of fiber openings defined as including a first aperture at said first end wall and a second aperture as said second end wall; and a plurality of connection indicator stripes associated with the plurality of fiber openings in a one-to-one relationship, each indicator stripe disposed along an underside of its associated fiber opening such that the first array of optical fibers is inserted through the first aperture and the second array of optical fibers is inserted through the second aperture of said fiber opening so that the first and second pluralities of optical fibers will cover the plurality of connection indicator stripes.

7. A restoration splice block as defined in claim 6 wherein said transparent member comprises a rectangular member and the plurality of fiber openings are disposed along the length of said rectangular member.

8. A restoration splice block as defined in claim 6 wherein the transparent member comprises a glass material.

9. A restoration splice block as defined in claim 6 wherein each connection indicator stripe is formed along a bottom surface portion of its associated fiber opening.

10. A restoration splice block as defined in claim 6 wherein each connection indicator stripe is formed along a bottom surface portion of the transparent member.

11. A method of splicing a first optical fiber to a second optical fiber, the method comprising the steps of:

a) preparing each optical fiber by exposing an end portion and cleaving the endface thereof;

b) providing a transparent restoration splice block defined as including a first end wall and a second end wall, said transparent restoration splice block including a fiber opening formed through the length thereof for accepting the cleaved end portions of the first and second optical fibers prepared in step a), said fiber opening including an indicator stripe formed along the bottom surface thereof;

c) inserting the first prepared optical fiber into the fiber opening through the first end wall;

d) inserting the second prepared optical fiber into the fiber opening through the second end wall; and e) moving the first and second fiber endfaces toward each other until the indicator stripe can no longer be seen.

12. The method as defined in claim 11 wherein in performing step b), a glass restoration splice block is provided.

13. The method as defined in claim 11 wherein in performing step b), a rectangular restoration splice block is provided.

* * * * *